United States Patent [19]

Ikegawa et al.

[11] Patent Number: 4,922,462
[45] Date of Patent: May 1, 1990

[54] REVERSIBLE MEMORY STRUCTURE FOR OPTICAL READING AND WRITING AND WHICH IS CAPABLE OF ERASURE

[75] Inventors: Sumio Ikegawa, Tokyo; Yoshiaki Terashima, Yokosuka; Nobuaki Yasuda, Zushi; Katsutarou Ichihara, Tokyo; Shuichi Komatsu, Yokohama; Shinji Arai, Chigasaki, all of Japan

[73] Assignee: Kabushiki Kaisha Toshiba, Kawasaki, Japan

[21] Appl. No.: 270,445

[22] Filed: Nov. 9, 1988

Related U.S. Application Data

[63] Continuation of Ser. No. 815,035, Dec. 30, 1985, abandoned.

[30] Foreign Application Priority Data

Dec. 28, 1984 [JP] Japan .................................. 59-276098
Nov. 7, 1985 [JP] Japan .................................. 60-247963
Nov. 7, 1985 [JP] Japan .................................. 60-247964

[51] Int. Cl.$^5$ ............................................. G11C 13/04
[52] U.S. Cl. ................................. 365/113; 365/127; 365/126; 369/100; 369/13
[58] Field of Search ........................ 369/100, 125–126, 369/13, 284; 365/113, 106, 124, 114, 118, 127; 430/19; 346/135.1, 137

[56] References Cited

U.S. PATENT DOCUMENTS

| 3,530,411 | 9/1970 | Ovshinsky | 365/113 |
| 4,371,954 | 2/1983 | Cornet | 360/126 |
| 4,527,173 | 7/1985 | Gupta et al. | 365/124 |

FOREIGN PATENT DOCUMENTS

| 0033667 | 8/1981 | European Pat. Off. | |
| 0139474 | 5/1985 | European Pat. Off. | |
| 0158804 | 10/1985 | European Pat. Off. | 365/113 |
| 2055756 | 11/1970 | Fed. Rep. of Germany | |
| 49-31041 | 12/1979 | Japan | 365/126 |
| 57-140845 | 2/1982 | Japan | 365/126 |
| 60-57551 | 4/1985 | Japan | 365/113 |
| 1486271 | 9/1977 | United Kingdom | 365/113 |

OTHER PUBLICATIONS

Larry Kaufman and Morris Cohen, "The Martensitic Transformation in the Iron-Nickel System", *Journal of Metals*, Oct. 1956.
R. J. Wasilewski, "The Effects of Applied Stress on the Martensitic Transformation in TiNi", *Metallurigical Transactions*, vol. 2, Nov. 1971.
Patents Abstracts of Japan, vol. 9, No. 190, (P-378) [1913], Aug. 7th, 1985; & JP A-60 57 551, (Nippon Denki K.K.).

*Primary Examiner*—Stuart N. Hecker
*Assistant Examiner*—Alfonso Garcia
*Attorney, Agent, or Firm*—Oblon, Spivak, McClelland, Maier & Neustadt

[57] ABSTRACT

In a reversible memory system, a pulsed laser beam generated from a laser unit is directed to a recording layer formed on a substrate 1. The recording layer essentially consists of a recording medium, for example, an iron-nickel alloy containing iron as a major component and 27 to 30 atomic % of nickel, which undergoes martensite transformation from a low-temperature phase to a high-temperature phase at a predetermined temperature Af and which undergoes a stress-induced transformation at a characteristic temperature Md. When a region of the recording layer is irradiated with the laser beam having a predetermined intensity, the region undergoes a stress-induced transformation so that the region is changed from the high temperature phase to the low temperature phase.

13 Claims, 13 Drawing Sheets

F I G. 20
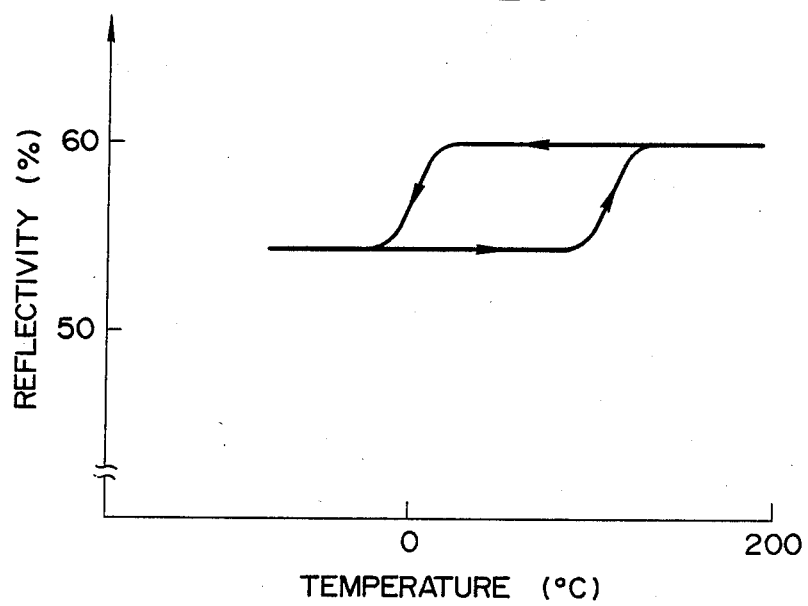
F I G. 21
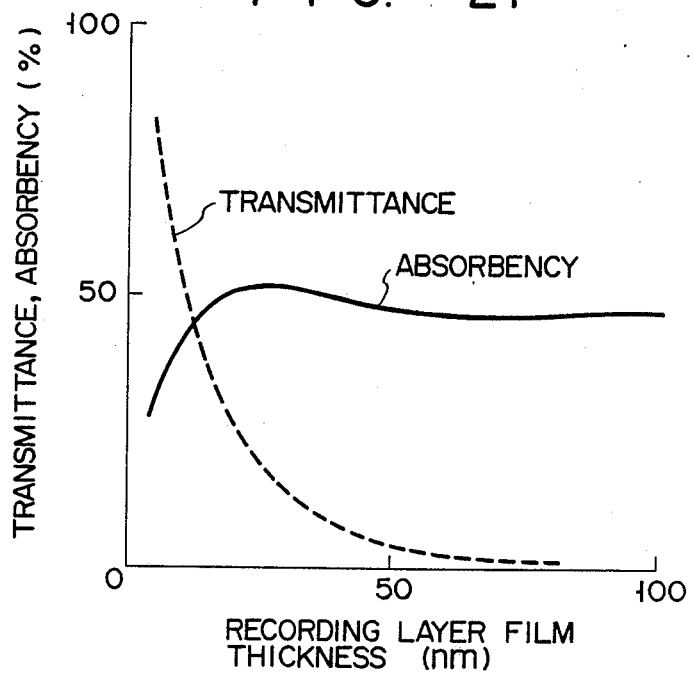

REVERSIBLE MEMORY STRUCTURE FOR OPTICAL READING AND WRITING AND WHICH IS CAPABLE OF ERASURE

This application is a continuation of application Ser. No. 815,035, filed on Dec. 30, 1985, now abandoned.

BACKGROUND OF THE INVENTION

The present invention relates to a reversible memory system which can thermally write information on a reversible memory medium, also thermally erase recorded information, and optically or magnetically read out information from the medium.

A memory device which can optically write, erase, or reproduce information in or from a reversible memory medium, i.e., a reversible memory disk, has been receiving a lot of attention recently due to high recording density and high random access speed. Such devices include magneto-optical memory media, which use the magneto-optical effect of a thin amorphous alloy film of a rare earth metal and a transition metal, and memory media which use phase transition between the amorphous and crystalline phases of metal.

However, mangeto-optical memory media are known to have the following problems:

(I) Reproduction of information is performed in accordance with the principle that the plane of polarization of linearly polarized light is rotated a maximum of several degrees. Since an optical system includes a polarizer and analyzer, it becomes complex in configuration and the S/N ratio of the reproduced signal is low.

(II) The thin amorphous alloy film of a rare earth metal and a transition metal as a memory medium can be easily oxidized in air. As a result, recorded information is lost, and the life of medium is short.

(III) Since a rare earth metal is used as a material for the recording medium, the cost is high as the costs of rare earth metal is high.

(IV) Since information is recorded by inversion of magnetic domains in the recording medium, the system must include a means for applying a magnetic field.

In a recording medium using phase transition between amorphous and crystalline phases, recording/erasure of information involves diffusion of atoms. Therefore, this type of medium is also susceptible to the following problems:

(I) Time required for recording or erasing 2-bit of information is long, thus maximum data transfer speed is limited.

(II) Thermal reversibility is gradually lost and some information may remain unerased after an erasure operation during heating/cooling of the medium being repeatedly performed.

Japanese Patent Disclosure No. 49-70547 or No. 49-131041 comprise a memory medium which uses phase transition of a metal semiconductor. However, in this medium, changes in volume of recording area of a thin metal film upon phase transition are large, and the medium may peel from its base. The medium in Japanese Patent Disclosure No. 49-70547 must also have a means for constantly maintaining the overall medium at a high temperature in order to hold recorded information. Therefore, this medium has poor applicability. In the medium of Japanese Patent Disclosure No.49-131041, a region of mechanical separation must be formed between tracks for recording laser beam and tracks for erasure laser beam, so that a high memory density cannot be obtained.

Japanese Patent Disclosure No. 56-124113 proposes a memory structure having a first layer with a second layer formed thereon and kept in the martensitic phase at room temperature. This memory structure allows erasure of information by a shape memory alloy. However, this structure is known to have the following problems:

(I) In this structure, information is recorded such that part of a memory medium on a substrate deforms and floats off from the substrate. Therefore, a memory medium film having poor adhesion strength with respect to the substrate must be formed. Even if a memory medium film having good adhesion strength with respect to the substrate is used, the film easily peels off of the substrate.

(II) Since the memory medium consists of at least two different layers and the two layers are required to have proper adhesion strength respectively, the process for manufacturing such a memory disk is complex in procedure and the manufacturing cost of the disk is thus increased.

SUMMARY OF THE INVENTION

It is an object of the present invention to provide a new reversible memory system which can freely record, reproduce, and erase information.

It is another object of the present invention to provide a reversible memory system which can record or erase information at high speed, obtain a reproduced signal with a high S/N ratio, and which has a simple configuration.

According to the present invention, there is provided a reversible memory system comprising:

a substrate having a surface;

a recording layer formed on the surface of the substrate and consisting of a recording medium which undergoes martensitic transformation from a first to a second phase at a predetermined temperature or upon application of pressure, and which undergoes a stress-induced transformation in a region in which a pressure is applied or produced at a temperature equal to a characteristic temperature Md or less, the region in which the pressure is applied or produced undergoing a transformation from the first to the second phase;

means for generating a pulsed laser beam;

means for directing the laser beam toward the recording layer in a recording mode, so as to allow the region in the recording layer irradiated with the laser beam to undergo a stress-induced transformation; and detecting means for detecting whether a region in the recording layer is in the first or second phase.

BRIEF DESCRIPTION OF THE DRAWINGS

FIG. 20 is a graph showing reflectivity as a function of temperature when an Ni-Al alloy is used as memory layers of a multi-layer structure of the present invention; and FIG. 21 is a graph showing reflectivity and absorbency as functions of film thickness when an Ni-Al alloy is used as a single memory layer of the present invention.

DETAILED DESCRIPTION OF THE PREFERRED EMBODIMENT

Figure 2:
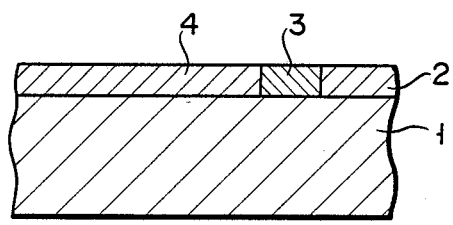
FIG. 2 is a sectional view showing a structure of a memory medium according to an embodiment of the present invention.

Before describing the embodiment of the present invention, the basic principles of recording, erasure, and reproduction of information according to the present invention will be described.

According to the present invention, a crystalline memory medium material is formed on a substrate. The memory medium material undergoes phase transition by application of a specific stress. Many substances, including metals such as Co or Zr, alloys such as stainless steel, and compounds such as $Nb_3Sn$ or $CuMo_6S_8$, are known to undergo a phase transition at specific temperatures or by the application of specific stresses. Temperatures at which phase transition occurs and hysteresis widths of such transition can be adjusted in accordance with the selection of materials, compositions and texture preparation methods. As a result of such adjustment, the crystal structure takes on a binary state at ambient temperature and thus can be used as a memory medium.

Of the materials which undergo phase transition when in crystal form, some materials also undergo martensitic transformation Fe-based alloys, e.g., Fe-C, Fe-Ni, Fe-Cr-C or Fe-Mn; Co-based alloys such as Co or Co-Ni; Ti-based alloys such as Ti-V, Ti-Cr, Ti-Mo or Ti-Ni; Cu-based alloys such as Cu-Al, Cu-Sn, or Cu-Zn; and others, e.g., Au-Zn, Au-Cd, Ag-Zn, Ag-Cd, Ni-Ti, Ni-Al, In-Tl, In-Cd, Mn-Cu, Mn-Ni, Mn-Au, $V_2O_3$, $ZrO_2$, or $BaTiO_3$. This martensitic transformation has a high reversibility and occurs at high speed, since atoms do not diffuse but move in an cooperative manner to change the crystal lattice structure. When this opposite transformation occurs, the transformation phase grows at a speed $\frac{1}{3}$ that of elastic wave speed in a solid.

Phase transition in most crystal structures is known to have some hysteresis with respect to temperature. Since the transition involves lattice structure change, it can also be caused by application of a stress to the crystal structure. For example, in the case of a martensitic transformation, a high-temperature phase is converted into a low-temperature phase upon application of a stress when the temperature is lower than predetermined characteristic temperature Md. This is called stress-induced transformation or stress-induced crystal structure phase transition. The temperature Md is a temperature above which a crystal phase transition to the low-temperature phase is not caused upon application of a stress. The low-temperature phase induced in this manner stably remains after the stress is removed if the temperature is lower than predetermined characteristic temperature As. In order to re-convert the low-temperature phase into the high-temperature phase, the crystal can be heated to a temperature higher than temperature As.

The principle of operation of a reversible memory system or device according to the present invention will be described with reference to FIG. 1. Under conditions where no stress is applied, during cooling, first crystal structure phase transition a1 occurs between temperatures Ms and Mf, lower than ambient temperature Ta. During heating, second crystal structure phase transistion b occurs between temperatures As and Af, higher than ambient temperature Ta.

Examples of memory media which cause such first and second phase transitions include Fe-Ni-based alloys such as Fe-Ni(27-34 wt %)-C(0-2 wt %), and Cu-Al-based alloys such as Cu-Al(9-15 wt %)-Ni(0-5 wt %). The first and second phase transistions occur particularly when the memory medium is a vacuum evapolation film containing copper as a major component and 9 to 15 % by weight of aluminum. In the initial state, the memory medium is in the high-temperature phase at point A, i.e., in the first phase, shown in FIG. 1. When the memory medium is heated locally, stress is generated in the heated portion. The heated portion undergoes stress-induced phase transition a2 through the path of points A→C→B and achieves the low-temperature second phase at point B, i.e., the second phase. The low-temperature phase at point B remains stable at ambient temperature Ta after local heating, i.e., stress is removed, thus establishing the recorded state.

FIG. 2 is a sectional view of a memory medium and a supporting substrate according to the present invention. Single-layer thin film 2 comprising a memory medium as described above is formed on glass or organic resin substrate 1. Region 3 of film 2 is a portion in which binary information "1" is recorded by a method to be described below.

Since a heated region or portion of medium 2 for storing information, is confined by the substrate 1 and its surrounding region or portion, internal stress $\sigma$ is produced in the heated region. This internal stress $\sigma$ is given by:

$$\sigma = E \times \Delta l/l \quad (1)$$

where E is the Young's modulus and $\Delta l/l$ is a coefficient for thermal expansion in such a heated region or portion, when the heated region or portion is not confined by substrate 1 and its surrounding portions of medium 2 and is given by:

$$\Delta l/l = \beta(T - Ta)$$

where $\beta$ is a coefficient of thermal expansion, Ta is ambient temperature, and T is the temperature of recording portion 3.

A general alloy, e.g., a Cu-Al-based alloy, has a $\beta$ value of $2 \times 10^{-5}$ (1/K) and an E value of up to $10^{11}$ (Pa). Thus, when recording portion 3 is heated to a temperature higher than the ambient temperature Ta by 150° C., an internal stress $\sigma = 300$ MPa is induced therein. In addition to above, when an abruptly temperature change is applied to the recording portion 3, the internal stress is concentrated in the recording portion 3. This internal stress has a sufficient magnitude to cause a stress-induced crystal structure phase transition. According to this principle, information can be recorded on memory medium 2 by heating locally it and inducing the phase transition.

The system of the present invention will now be described in general. When a local stress is induced in recording portion 3, a memory system adopting this recording/erasure/reproduction system can be accomplished without substrate 1. However, the thin memory medium is preferably formed on a substrate, since local heating and handling of the medium is then easy. When a thin film memory medium is formed on a substrate, since local stress is produced in the medium, it must have a high adhesion strength to the substrate, in order not to peel therefrom. When the stress-induced crystal structure phase transition is a martensitic transformation, a medium is formed such that a low-temperature phase having a direction and twin crystal structure to moderate stress is produced when the high-temperature phase is converted into the low-temperature phase. Thus, the stress remaining after the phase transition can be suitably reduced. The substrate preferably consists of a material which has a thermal conductivity lower than that of the memory medium, e.g., glass or an organic resin.

As a method of locally heating a recording portion of the memory medium and generating a stress therein, a method using a laser beam is used. In this method, the laser beam having a size of about 1 $\mu$m is radiated on the medium at a pulse width which causes only negligible thermal diffusion in the medium surface, and at power at which the temperature of medium does not exceed the characteristic temperature Md.

The local heating method is not limited to a laser beam, however. Other methods in which no substantial thermal diffusion into the medium surface occurs and the temperature does not exceed Md can be used. For example, a small heater can be used to locally heat the memory medium.

In order to erase information from the memory medium, the medium in the low-temperature phase (point B in FIG. 1) is heated to a temperature above temperature Af, in order to reach point D, at which point the phase transition occurs. The medium then goes to the high-temperature phase at point E, and thereafter, is returned to point A. When such a state change through the path B→D→E→A is followed, the information recorded in the initial state at point A is erased. In this erasure step, if thermal stress occurs locally and crystal structure phase transition a2 occurs in a non-recording or high-temperature phase region during the initial heating step and the phase in this region is thus converted into the low-temperature phase, alternatively, when the medium is heated to a temperature higher than temperature Af and Md, all low-temperature phase regions are converted into high-temperature phase regions.

Figure 1:
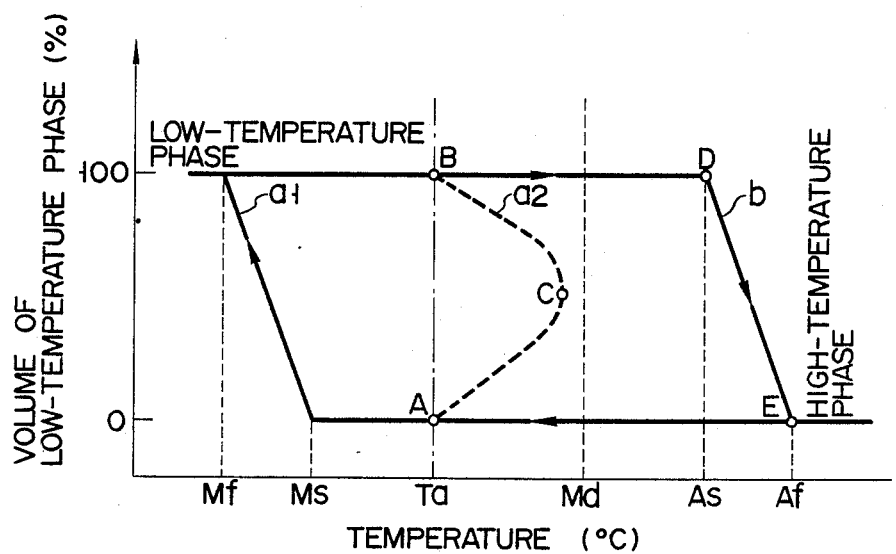
FIG. 1 is a graph showing the phase transition dependent on temperature for explaining the principles of information recording, reproduction, and erasure according to the present invention.

As an example of the heating step, not only the medium but also the substrate can be heated to a temperature higher than temperature Af of FIG. 1, under the control of a high-temperature thermostat. In another simple heating method, a laser beam is radiated onto an erasure portion of the medium to heat this portion to a temperature higher than temperature Af. In using a laser beam, not all information recorded in the medium is erased, but only certain unnecessary information. When this method is adopted, a mechanical separation region for separating tracks for recording laser beam and tracks for erasure laser beam need not be formed. When information is actually erased, in order to prevent unnecessary concentration of thermal stress, a laser beam preferably has either a pulse width or a beam diameter longer or larger than that of the recording mode or both of these features.

Information recorded in this manner is reproduced in accordance with the difference in crystal structure or electron state between high-and low-temperature phases, and resulting difference in optical reflectivity thereof. In other words, recorded information is reproduced in accordance with a difference in optical reflectivity.

When phase transition a2 of FIG. 1 is a martensitic transformation in a special condition or case, the surface of the low-temperature phase recorded region can project from the flat surface of the high-temperature phase regions so that a surface relief is produced. When the projecting surface of the low-temperature phase region is converted into the high-temperature phase, this surface returns to being a flat surface, thus having undergone a reversible change. The projecting surface of the low-temperature phase region scatters light, inducing a difference in optical reflectivity between its projecting surface and the flat surface of the high-temperature phase regions.

When such a projecting surface is formed, instead of detecting a difference in optical reflectivity, another method such as a contact probe method or a method of detecting the capacitance can be adopted. Particularly when an alloy containing Fe as a main component undergoes the martensitic transformation, since the high-temperature phase is paramagnetic and the low-temperature phase is ferromagnetic, a method of detecting a difference in magnetic property can be adopted. For example, information can be reproduced by a conventional magnetic head or a method using a magneto-optical effect.

The recording/erasure/reproduction principles of the method according to the present invention have been described. When speed of recording/erasure/reproduction, random access time, and recording density are considered, a light beam is preferably used as the means for information recording/erasure/reproduction. When high speed in recording/erasure, reversibility in recording/erasure, and the S/N ratio of reproduced information using a light beam are additionally considered, the memory medium preferably comprises a material which is capable of undergoing a martensitic transformation.

A method of manufacturing a memory medium used in a reversible memory system according to the present invention will be described below.

Figure 3:
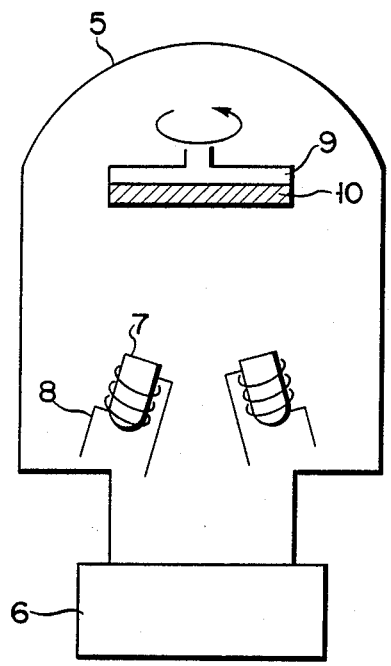
FIG. 3 is a schematic view showing an example of an apparatus for manufacturing the memory medium shown in FIG. 2.

FIG. 3 schematically shows an apparatus for manufacturing a memory medium according to the present invention. In this apparatus, vacuum container 5 is mounted on evacuation system 6 for evacuating container 5. A ceramic crucible 7 is arranged in container 5, and a heater 8 is mounted thereon. Turntable 9, driven by a driver (not shown), is arranged in container 5. Substrate 10 of glass, quartz, polymethyl methacrylate, epoxy, or silicon is placed on turntable 9. Substrate 10 is turned on turntable 9 and a uniform film is formed thereon. The container 5 is an evacuated by evacuation system 6 to a vacuum of $1 \times 10^{-5}$ Torr or less. A deposition source in crucible 7 is heated by heater 8, and the material evaporated is deposited on substrate 10.

In the apparatus shown in FIG. 3, two sets of heaters 8 and crucibles 7 are included. Cu is placed in one crucible 7, and Al is placed in the other. Power supply of respective heaters 8 is controlled so as to precisely control the amount of evaporation from respective crucibles 7. Cu-Al alloy films are thus formed as deposition films on substrate 9. When Cu-Al alloy films of various compositions were formed and their electrical resistances and optical reflectivity as a function of temperature were measured, it was found that a memory medium which undergoes a martensitic transformation can be obtained when the Al content of the memory medium is set to be from 9% to 15% by weight.

Figure 4:
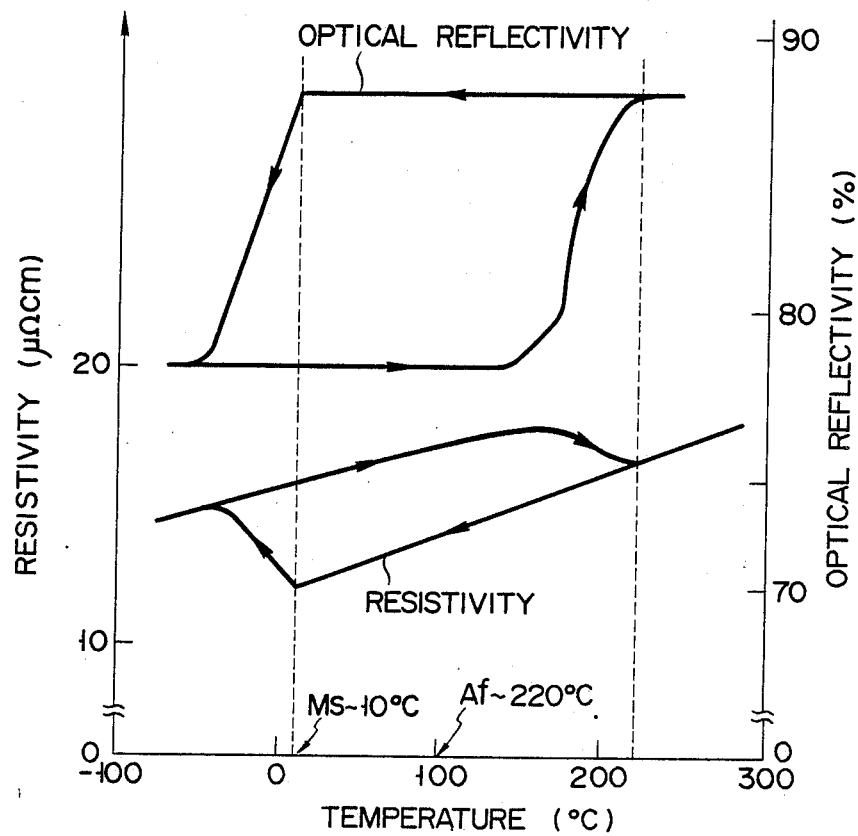
FIG. 4 is a graph showing an example of temperature characteristics of a Cu-Al-based alloy memory layer, which can be used as a memory medium according to the present invention.

FIG. 4 is a graph showing an example of electrical resistances and optical reflectivity as a function of temperature for Cu-Al alloy films deposited to a thickness of 5,000 Å on Si substrates with thermal oxide films. The optical reflectivity was measured by irradiating the film with a beam from an He-Ne laser (wavelength: 633 nm) and measuring the intensity of reflected light. The diameter of the laser beam used was 1 mm, the power on the irradiated surface was 1 mW, and radiation power per unit area was decreased to a level such that the temperature of the memory medium is not increased. The resistance and optical reflectivity were measured by heating or cooling at a rate of 20 centigrade degrees per minute.

It can be seen from FIG. 4 that as the crystal structure phase transition occurs, the electron state changes, the electrical resistance changes, and the optical reflectivity changes. The high-temperature phase was observed to be red in color, and low-temperature phase, golden. The electrical resistance and optical reflectivity was changed as above 10 heating/cooling cycles, and no peeling of the Cu-Al films was observed.

As shown in FIG. 4, when the conditions for forming a film as a memory medium are optimized, i.e., when the amounts of evaporated of Cu and Al during the manufacture of such a medium are controlled so as to precisely adjust the composition of the memory medium, a medium which undergoes an optimal crystal structure phase transistion which can be used at room temperature, can be formed on a substrate. The memory medium optimal for use at room temperature which has a temperature Ms, at which phase the transition al begins at 10° C. and at which its temperature Af (the point at which phase transition bends) is at 220° C.

Figure 5:
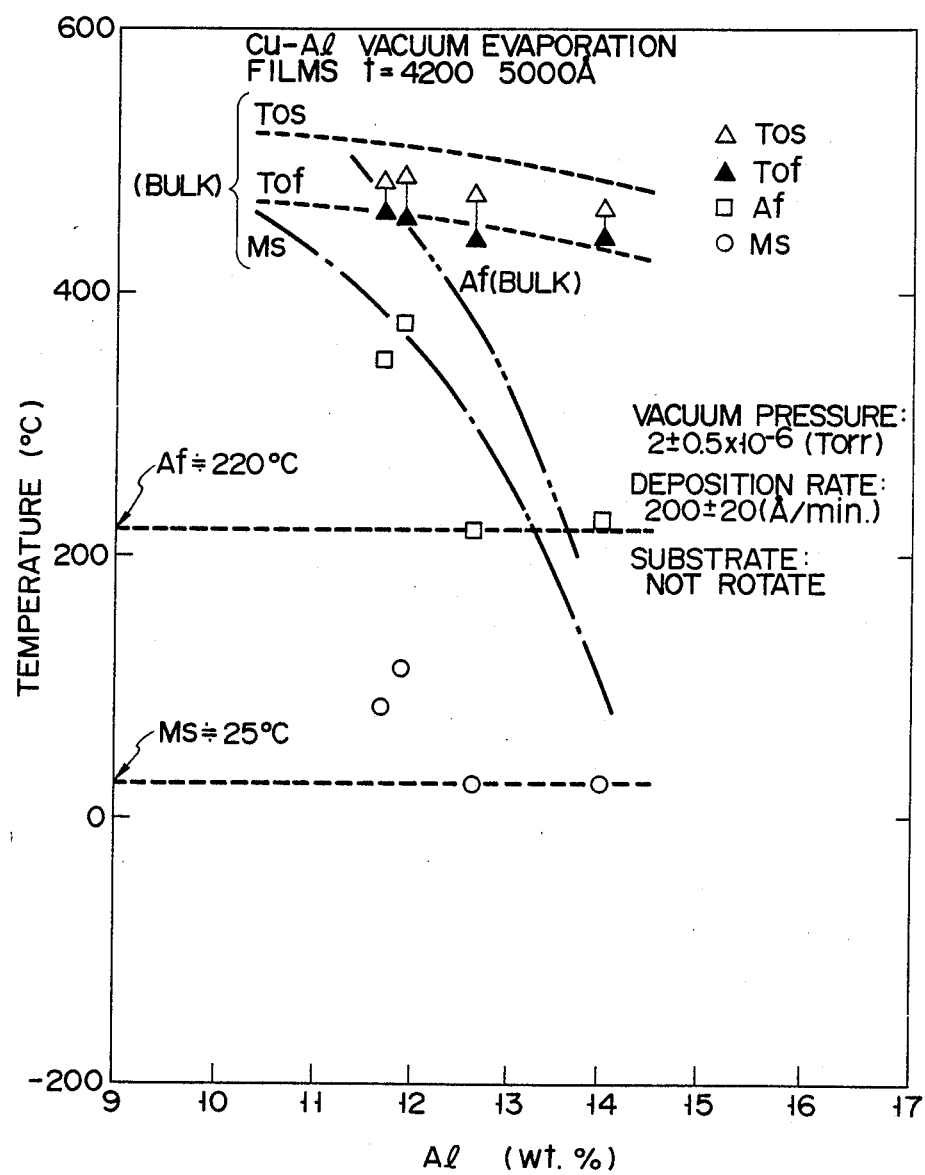
FIG. 5 is a graph showing changes in characteristics when the composition of the Cu-Al-based alloy memory layer is changed.
Figure 6:
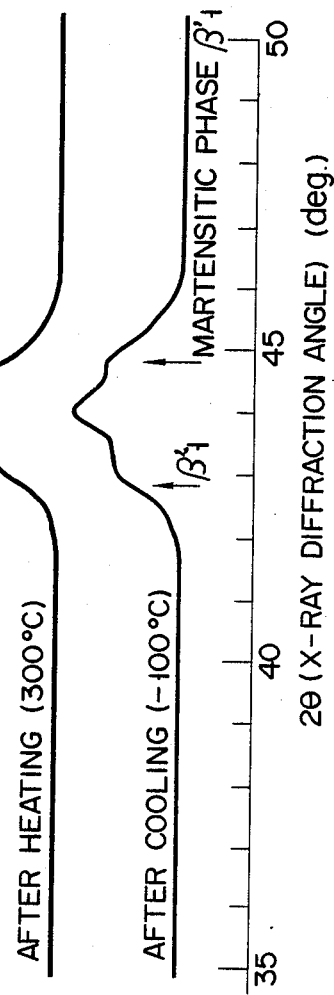
FIG. 6 shows an X-ray diffraction pattern of a Cu-Al-based alloy memory layer having a specific crystal structure, for use as a memory medium according to the present invention.

Depending on particular conditions for forming a film as a memory medium, a medium can be formed which allows erasure of information by a phase transition upon heating, even if the temperature Ms, at which phase transition al begins is 25° C., and the temperature Af, at which phase transition b ends is 220±20° C., is shown in FIG. 5. An example of such a memory medium is one which has two types of crystal structures which have prefered orientation such that the plane of maximum density is parallel to the substrate surface, as indicated by the X-ray diffraction pattern of FIG. 6.

When a difference in optical reflectivity is used to detect the presence or absence of information the difference must be at least 3%. A memory medium which can achieve a difference in optical reflectivity of 10% can be formed by setting optimal film forming conditions and by precisely controlling the amount of evaporated Cu and Al during film deposition, thereby achieving optimal film composition and thickness.

A memory disk obtained by forming a 800 Å-thick Cu-Al alloy film on a glass substrate with the above method was subjected to the following test. The initial state recording phase of this medium was in the red, at high-temperature phase. The sample surface was irradiated with an He-Ne laser pulse converged to a spot of 1 μm diameter and a power of 15 mW for 300 nsec. [F.W.H.M. (Full Width of Half Maxima)]. The irradiated portion was found to have low optical reflectivity. When the medium was heated to 300° C. in an electric furnace together with the substrate and then removed, the irradiated portion had returned to the same red as occurred the high-temperature phase of the non-irradiated portions of the film.

Figure 7:
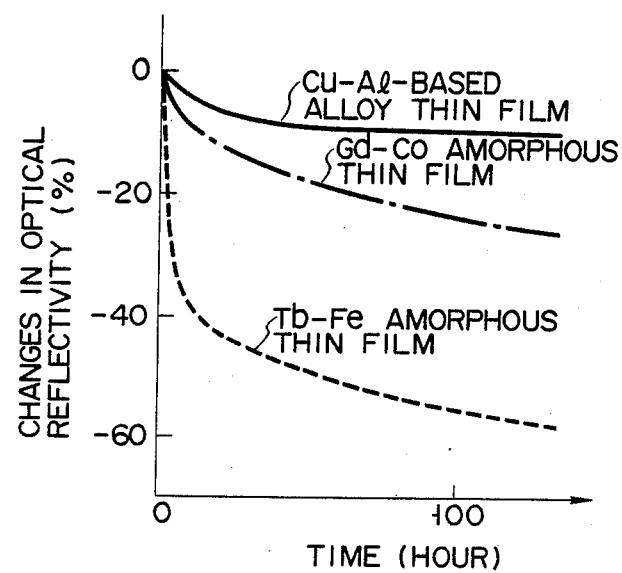
FIG. 7 is a graph showing weather resistance of the Cu-Al-based alloy memory layer according to the present invention together with that of other alloy memory media.

In order to test oxidation and weather resistance of the memory medium, a similar sample was subjected to an accelerated aging test at high temperature and humidity conditions (i.e., 70° C., 85% RH). To obtain an index of aging, optical reflectivity was measured every hour. FIG. 7 shows an example of the measured results. The time at which the medium was placed in the high temperature and humidity conditions is plotted along the abscissa, and the optical reflectivity, given by $\{R(x)-R(0)\}/R(0)$, where $R(x)$ is reflectivity at a wavelength of 633 nm after x hours, is plotted along the ordinate. As a Control, FIG. 7 shows results similarly obtained with Tb-Fe and Gd-Co amorphous films as typical examples of rare earth metal and transition metal magneto-optical memory media. As can be seen from FIG. 7, a Cu-Al alloy film undergoes only a small decrease in optical reflectivity in high temperature, and humidity conditions and exhibits excellent oxidation and weather resistance when compared with conventional magneto-optical memory media which use rare earth metals.

The desirable properties of Cu-Al alloys can also be achieved with Cu-Al-Ni ternary alloys, which are obtained by adding Ni in a range of 0 to 5% by weight to binary Cu(9-15%)-Al alloys. Although the phase transition temperature changes slightly with the addition of Ni, when both the Al and Ni contents are increased within the above ranges, a memory medium which undergoes a phase transition at a temperature lower than Cu-Al binary alloys can be obtained.

Figure 8:
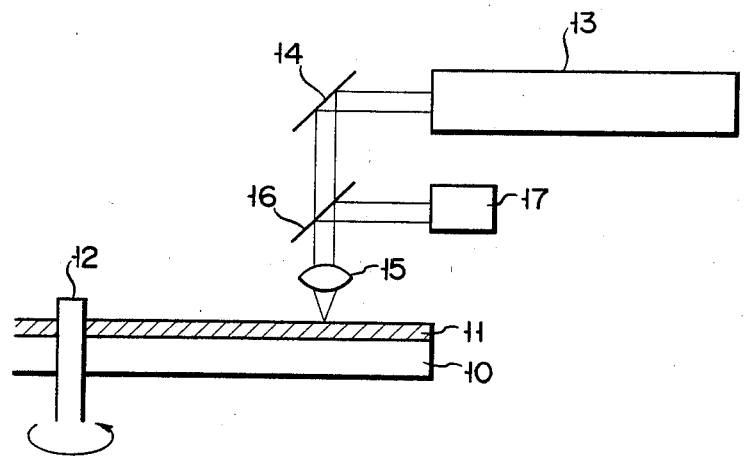
FIG. 8 is a schematic view showing a system for recording, reproducing, or erasing information according to an embodiment of the present invention.

FIG. 8 shows the configuration of a system using a memory medium and recording/erasing information with a light beam according to an embodiment of the present invention. Memory medium 11 is formed on substrate 10 of glass or an organic resin, and placed on a turntable (not shown). The turntable is rotated by rotating shaft 12, driven by a drive source (not shown). A laser beam from laser beam generator 13 is reflected by reflecting mirror 14 and directed toward objective lens 15. The beam is converged by lens 15 and radiated onto medium 11. Half mirror 16 is inserted between mirror 14 and lens 15. The laser beam reflected by medium 11 is then reflected by half mirror 16 and becomes incident on photodetector 17. In the recording mode, the laser beam from generator 13 is modulated by a recording signal and is pulsed. In the reproduction mode, a laser beam of a specific intensity is generated. In the erasure mode, a laser beam of a specific intensity higher than that of reproduction mode is generated.

In the system shown in FIG. 8, in the recording mode, medium 11 is irradiated with a laser beam which is focused thereon by objective lens 15, for heating the medium 11 locally. The laser beam has a pulse width at which no substantial thermal diffusion into the plane of medium 11 occurs, and has a power at which the temperature of the irradiated portion is lower than temperature Md of FIG. 2.

In the erasure mode, in order to heat the medium 11 to a temperature higher than Af of determined from FIG. 2, a laser beam pulse having an energy higher than that in the recording mode is generated. In this case, in order to prevent local concentration of thermal stress in medium 11, a laser beam having a pulse width longer or a diameter larger than than in the recording mode is radiated. In addition, in the erasure mode, a laser beam having both a pulse width longer and a diameter larger than that in the recording mode can be used. In order to increase the diameter of the laser beam, the focal point of lens 15 is shifted slightly from the surface of medium 11. Alternatively, a separate erasure light beam path can be arranged in the optical system.

In the above embodiment, the recording of binary information "1" state corresponds to the state wherein the crystal structure is converted from the high-temperature phase (first phase) to the low-temperature phase (second phase) by generating a local thermal stress. Alternatively the first phase can be the information "1" state.

When a light beam is used for recording/erasure/reproduction of information as in the system shown in FIG. 8, an additional heating means, a means for applying a magnetic field, and a polarizer or an analyzer in the optical path can be omitted, and a very simple memory medium system can be obtained. However, in order to provide a practical medium, a substrate must have guide grooves or tracking guides, a means for allowing the optical system to correctly track the guide grooves, and a means for automatically focusing the optical system must be provided.

As a second embodiment of the present invention, a description will now be made with reference to a memory disk in which an Fe-Ni-based alloy is a memory medium formed on a substrate by the apparatus of FIG. 3.

Figure 9:
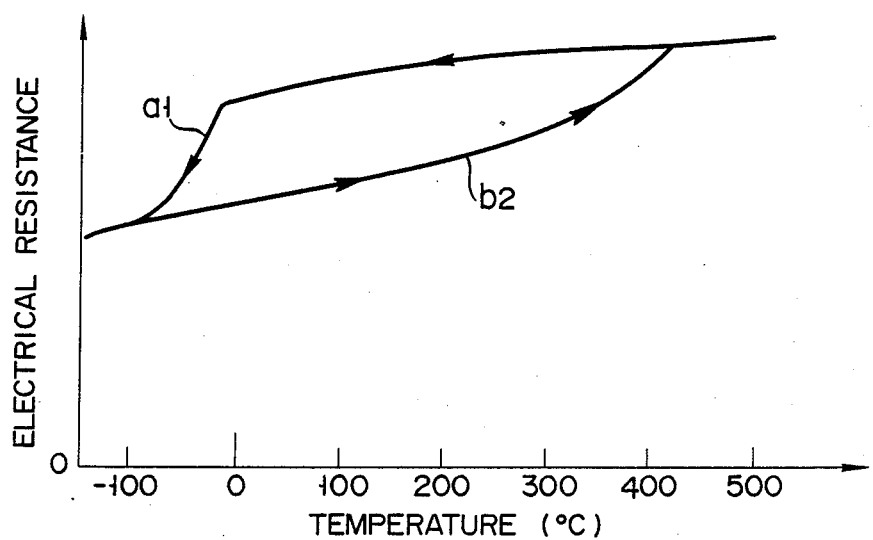
FIG. 9 is a graph showing an example of temperature characteristics of an Fe-Ni-based alloy memory layer which can be used as a memory layer according to another embodiment of the present invention.

When the memory medium is an Fe-Ni-based alloy, a medium capable of the martensitic transformation within an Ni content range of 27 to 34 weight % can be obtained. FIG. 9 shows electrical resistance as a function of temperature when such an Fe-Ni-based alloy film is used as a memory medium. When experiments were performed under precise control to obtain optimal film formation conditions, the phase transition a1 occurred at a temperature lower than room temperature, and phase transition b occurred at a temperature above room temperature, actually close to 400° C., thereby providing an optimal memory medium. When carbon is added to the Fe-Ni alloy in an amount of up to 2% by weight, the memory medium can still provide the same effect. In this case, as the carbon content increases, the phase transition temperature decreases.

The above descriptions have been made wherein Cu-Al-based and Fe-Ni-based alloys are used as memory media. However, based on the basic principles of the present invention, other materials can be used as a memory medium if such materials undergo the phase transition a1 from a first phase to a second phase and phase transition b from the second phase to the first phase at temperatures lower than room temperature with no application of external stress, and phase transition a2 from the first phase to the second phase depending upon the stress at a temperature above room temperature. In the reversible memory system according to the present invention, a light beam need not be used for all means for recording, erasure, and reproduction, and other means such as thermal or mangetic means can be used.

Such a suitable material for use as a memory medium in a memory system according to the present invention will be described below.

According to the experiments conducted by the present inventors, when a stress-induced transformation is a martensitic transformation, if special attention is paid to temperatures Ms, Mf, As, and Af of the medium material, in Fe-Ni alloys, an alloy containing Fe as a major component and 27 to 34 weight % of Ni is preferable, and an Fe-Ni alloy containing 27 to 30 atomic % Ni is particularly preferable. When the Ni content is less than 27% by weight the temperature Ms becomes lower than room temperature. When the Ni content exceeds 34% by weight, the stress-induced martensitic transformation does not occur easily in the room temperature.

According to the above information, samples having various alloy compositions were manufactured and irradiated with a laser beam to induce the martensitic transformation. Experiments on information recording were also repeated for these samples. When the Ni content exceeds 30 atomic %, stress required to induce the martensitic tansformation increased and temperature Md decreased. Thus, with this composition, it is seen that the martensitic transformation does not easily occur.

Examples of experiments with Fe-Ni alloys with the above-mentioned compositions will be described below.

APPLICATION EXAMPLE (1)

Samples were obtained by arc-melting Ni and Fe elements at various composition ratios, cutting the results into plates having thicknesses of 0.3 to 1.5 mm, and then polishing the plates. In order to remove processing strain, the plates were heat-treated at 800° C. for 20 minutes.

The samples were subjected to (1) a test wherein a needle was pressed onto the samples, and (2) a test wherein the samples were irradiated with a laser beam to see if a stress-induced martensitic transformation occurred. Table I shows results obtained. The conditions for obtaining the test results indicated in Table I were as follows. The laser used was a YAG laser, which generated a laser pulse having a short pulse width using a Q switch, and which had a wavelength of 1.06 μm. The laser beam was converged by an objective lens having a focal length of 20 mm to a beam spot diameter of 60 μm. The laser beam had a radiation power of 200W and a pulse width of 200 nsec (F.W.H.M). Table I lists the sample compositions, martensitic transformation start temperatures Ms, opposite transformation end temperatures Af, and crystal structures of samples at room temperature immediately after heat-treatment, analyzed by X-ray diffraction. The degree of induction of the martensitic transformation from a clear to unclear state was evaluated in the order of ⊙, o, and Δ. x indicates that no change occurred.

TABLE I

| Sample | Composition | Transformation Temperature Ms[°C.] | Af[°C.] | Initial Crystal Structure | Stress-Induced Transformation Needle | Laser Beam Radiation |
|---|---|---|---|---|---|---|
| a | Fe-19.0% Ni | 210 | 605 | martensitic phase | x | x |
| b | Fe-23.8% Ni | 120 | 570 | martensitic phase | x | x |
| c | Fe-27.5% Ni | 10 | 530 | austenitic phase | ⊙ | ⊙ |
| d | Fe-29.3% Ni | −30 | 440 | austenitic phase | o | Δ |
| e | Fe-31.3% Ni | −100 | 420 | austenitic phase | x | x |

In Table I, with samples (a) and (b), no change was observed in tests (1) and (2). This is because the two samples in the initial state are already in the martensitic phase at room temperature. With samples (c) and (d), when the samples were subjected to the needle test and the laser beam irradiation test and were observed with a microscope, it was confirmed that the martensitic phase was locally induced by stress. When sample (e) was subjected to the needle test and the laser beam irradiation test, no change was observed. Portions of samples (c) and (d) locally converted to the martensitic phase by irradiation with a laser beam were heated at 600° C. above opposite transformation end temperature Af. The samples returned to the uniform austenitic phase.

In an optical system for recording information by causing local stress-induced transformation of a memory medium, erasing recorded information by heating the medium to a temperature above temperature Af, and optically reproducing recorded information, if the memory medium is an Fe-Ni alloy, it optimally contains Fe as a major component and 27 to 30 atomic % of Ni.

APPLICATION EXAMPLE (2)

Figure 10:
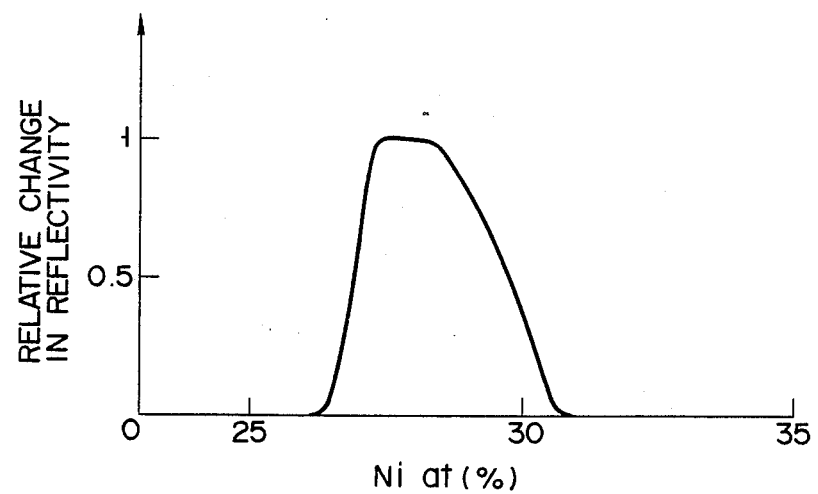
FIG. 10 is a graph showing relative changes in reflectivity when the composition of the Fe-Ni-based alloy memory layer is changed.

Samples were prepared by finely changing the compositions by the same method as in Example (1). The samples were irradiated with a laser beam under the similar conditions as in Example (1). The difference in reflectivity between the portions of the samples which were and were not irradiated with a laser beam was measured for light having a wavelength of 830 nm. FIG. 10 shows the obtained results. The Ni content of the medium is plotted along the abscissa, and relative change in reflectivity normalized with respect to 1 as a maximum value is plotted along the ordinate. It is seen from FIG. 10 that when the memory medium is an Fe-Ni alloy, Ni is optimally contained in an amount of 27 to 30 atomic %.

When the stress-induced transformation is the martensitic transformation in this Example, if the low-temperature phase is the martensitic phase and the high-temperature phase is the austenitic phase, each phase can contain a small amount of the other phase as so long as a satisfactory reproduced signal is obtained. That is, in this case, the non-recording portion need not comprise 100% austenitic phase, and the recording portion need not comprise 100% martensitic phase.

A description will now be made with reference to a case of a memory medium having a suitable structure for recording and reproducing information by irradiation with a laser beam.

Figure 11:
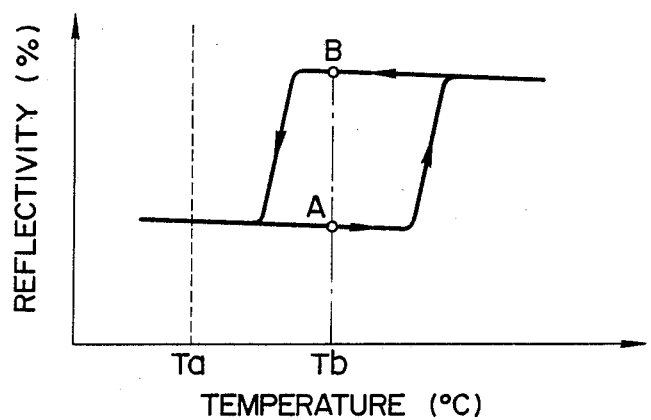
FIGS. 11 and 12 are graphs showing reflectivity as a function of temperature, for explaining two different recording/erasure methods.
Figure 12:
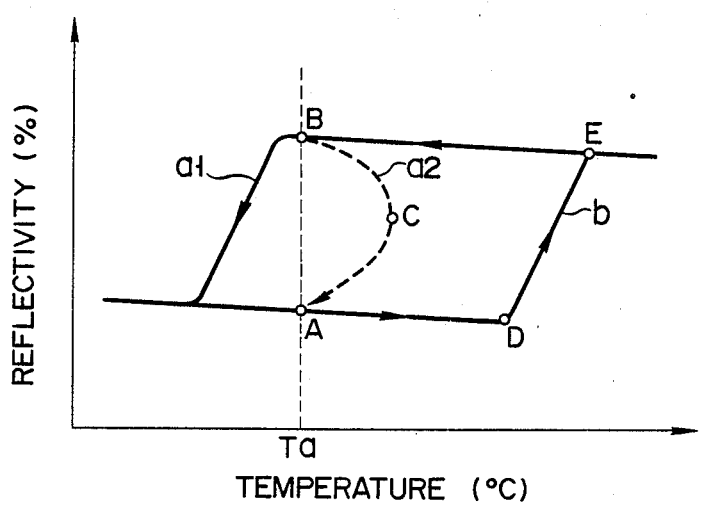

There are two methods for recording and erasing information in optical memory media. According to the first method, a memory medium capable of a crystal structure phase transition as shown in FIG. 11 is used. The memory medium is held at temperature Tb higher than ambient temperature Ta and maintained at point A of the low-temperature phase in the initial state. In order to record information in this state, a recording portion of the medium is irradiated with a laser beam pulse and its temperature is temporarily increased. Thus, the recording portion is phase-shifted to point B of the high-temperature phase having a different reflectivity, thereby completing recording. When such recorded information is erased, the temperature of the medium is decreased to a temperature near ambient temperature Ta. The overall medium is phase-shifted to the low-temperature phase and information is erased. In the second method, a medium capable of a crystal structure phase transition as shown in FIG. 12 is used. The medium is maintained at point B of the high-temperature phase at ambient temperature Ta in the initial state. When information is recorded, a recording portion of the medium is irradiated with a laser beam focused by an objective lens. The laser beam is pulsed at a short pulse width such that thermal diffusion to the surface of the recording layer is negligible. The recording portion is rapidly heated. Upon being heated, local stress induces the stress-induced phase transition a2, and information is recorded by following the path of B→C→A. As a result, the recording portion is converted to the low-temperature phase having a different reflectivity from that of the high-temperature phase, thereby recording information on the medium which can be read by a conventional. In order to erase information, the memory medium is gradually heated and gradually cooled under conditions such that no local stress acts on the medium. The medium is reconverted into the high-temperature phase through the path of A→D→E→B. The second method is considered to be preferable when compared with the first method, since the medium is kept at room temperature.

Materials suitable for use in such optical memory media include those which do not allow picking up of reproduction signals of sufficiently high level due to small change in optical reflectivity upon phase transition, those which have only low absorbency of optical energy (low sensitivity) during laser beam recording due to high optical reflectivity, and the like. According to a modification of the present invention, in order to improve optical characteristics of a thin recording film, a transparent dielectric film and, if required, a thin film as a reflection layer are formed. According to the studies made by the present inventors, when a thin transparent dielectric film is stacked on a recording layer, the change in optical reflectivity upon phase transition is enhanced. As a result of such enhancement, the S/N ratio of the reproduced information is improved. In a memory medium of a structure for enhancing reflectivity change, if the reflectivity of the overall medium was low and the medium was irradiated with a light beam of a predetermined intensity, the absorbency of the energy in the recording layer was improved. As a result, information that is to be written on the medium by a light beam is facilitated, and system design is also facilitated. When the memory medium is multilayered, the reflectivity of the overall medium is lowered, and the reflectivity of the reproducing light beam becomes less than 10%, resulting in a problem. In view of this, a memory medium preferably has a structure wherein the reflectivity change is enhanced, the optical energy absorbency in the thin crystalline film is improved, and reflectivity of the reproducing light beam is sufficiently high. FIGS. 13A to 15B show memory media having multilayered structures for this purpose.

Figure 13A:
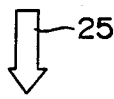
FIGS. 13A, 13B, 14A, 14B, 15A and 15B show multilayered structures of recording media according to modifications of the present invention.
Figure 13A:
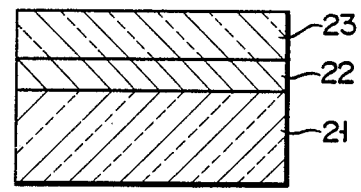

In the multilayered structure shown in FIG. 13A, thin crystalline film 22 as the recording layer capable of undergoing a phase transition is formed on substrate 21 consisting of glass or an organic resin. Thin transparent dielectric film 23 is formed on film 22. Film 23 preferably consists of a thermally stable material such as silicon oxide or silicon nitride. In order to prevent corrosion of recording layer 22, silicon nitride is preferable for film 23.

Figure 13B:
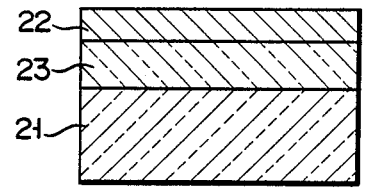

In the structure shown in FIG. 13A, laser beam 25 is radiated onto film 22 from the side of film 23. However, when laser beam 26 is radiated onto film 22 through substrate 21, a structure shown in FIG. 13B is preferable wherein the dielectric film 23 is formed on substrate 21 and a film 22 is formed on film 23. In FIGS. 13A and 13B, a laser beam incident on film 23 is reflected inside film 23. Thus, the incident light is effectively utilized.

Figure 14A:
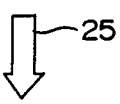
Figure 14A:
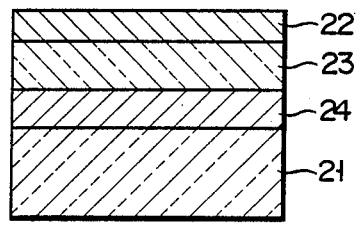
Figure 14B:
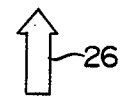
Figure 14B:
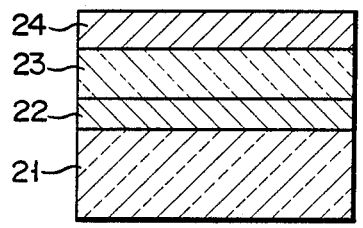

In the multilayered structures shown in FIGS. 14A and 14B, reflection film 24 of Al or the like is added to the structure shown in FIGS. 13A and 13B. In the structure shown in FIG. 14A, reflection film 24 is formed on substrate 21, dielectric film 23 is formed on film 24, and recording layer 22 is formed on film 23. In the structure shown in FIG. 14B, memory medium 22 is formed on substrate 21, dielectric film 23 is formed on medium 22, and reflection film 24 is formed on film 23. In the multilayered structures shown in FIGS. 14A and 14B, the laser beam which has passed through film 22 is reflected by film 24, and becomes incident on film 22. Thus, the incident laser beam is effectively utilized.

Figure 15A:
Figure 15A:
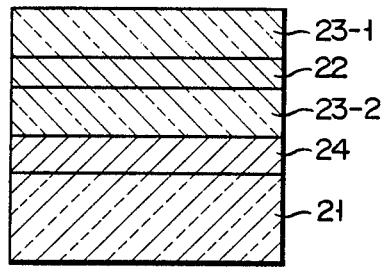
Figure 15B:
Figure 15B:
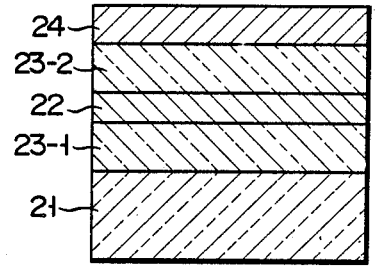
Figure 15B:

In the multilayered structures shown in FIGS. 15A and 15B, recording medium 22 is formed between first and second dielectric films 23-1 and 23-2 shown in FIGS. 14A and 14B in order to protect the media.

In the above embodiments, the wavelength of the laser beam used is not particularly limited. However, it is considered to be practical to use an He-Ne laser or a semiconductor laser as the laser unit employed so as to radiate a laser beam having a wavelength of 630 to 830 nm to the medium. In the multilayered structures of the above examples, the recording region has complex index of refraction from the erasing region for light rays within a specific wavelength region. The recorded and erased portions of the media having such multilayered structures have a different reflectivity in accordance with the difference in the complex index of refraction. Signals can be reproduced from the media with an improved S/N ratio compared with the single layered structure.

Applications of the modifications will be described below.

APPLICATION EXAMPLE 1

A Cu-Al(9-15 wt %)-Ni(0-5 wt %) was used as a crystalline thin film, and a bilayered structure was adopted. This alloy can undergo the martensitic transformation and change optical reflectivity thereupon. In Application Example 2 to be described with this example, the recording layer was formed by a binary RF magnetron sputtering method. Sputter targets were 5" Al and Cu targets, and the sputtering gas was 4NAr gas. The flow rate of the Ar gas was 70 SCCM and the pressure was 5 mTorr. The initial vacuum pressure was $2 \times 10^{-5}$ Torr or less. Power applied to each target was controlled to be 300 to 400W with high precision so as to adjust the composition of the medium. The interval between the substrate and the targets was 170 mm, and the substrate was rotated at 60 rpm during film deposition.

The film deposition rate was 20 to 25 nm/min under the above conditions. Silicon nitride and Al reflection films to be described in Application Examples 1, 2, and 3 were formed by the RF magnetron sputtering method as described above. When the silicon nitride film was formed, however, polycrystalline nitride silicon was used as a target, and a gas consisting of Ar and 10 to 30% of $N_2$ was used as the sputtering gas.

Figure 16:
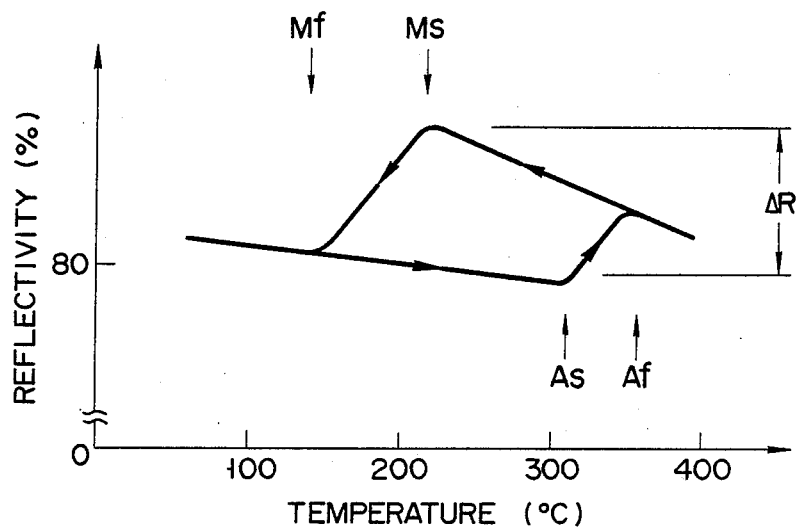
FIG. 16 is a graph showing reflectivity as a function of temperature when the Cu-Al memory layer is used as a recording layer of a multilayered memory medium.

FIG. 16 shows changes in reflectivity, as a function of temperature, of a 500 nm thick Cu-Al(13.8 wt %) alloy film deposited on a glass substrate for a laser beam having a wavelength of 633 nm. Measurement was performed by repeatedly heating and cooling the sample having such a single-layer structure at a rate of 20° C./min. During cooling, the reflectivity decreased at martensitic transformation start temperature Ms. During heating, the reflectivity increased in accordance with reverse transformation from reverse transformation start temperature As (up to 315° C.) to reverse transformation end temperature Af (up to 350° C.). The relative change in reflectivity $\Delta R/R$ is obtained by dividing rate of change $\Delta R$ in reflectivity by average reflectivity R in both the phases. In a description to follow, enhancement coefficient E of reflectivity change is a value obtained by dividing the relative change ($\Delta R/R$) of a multilayered structure by ($\Delta Rs/Rs$) of a single-layer structure of a Cu-Al alloy film.

Silicon nitride films of various thicknesses were deposited as dielectric films on similar Cu-Al(13.8 wt %) alloy thin films to provide the structure as shown in FIG. 13A, and similar tests were performed. More specifically, an He-Ne laser beam having a wavelength of 633 nm, a beam spot size of 1 mm and a power of about 1 mW was radiated from the side of the dielectric film, and enhancement coefficient E of reflectivity change was determined. For each sample, spectral reflectivity and spectral transmittance at room temperature were measured using carry 17, and reflectivity and absorbency at a wavelength of 633 nm was determined.

Figure 17:
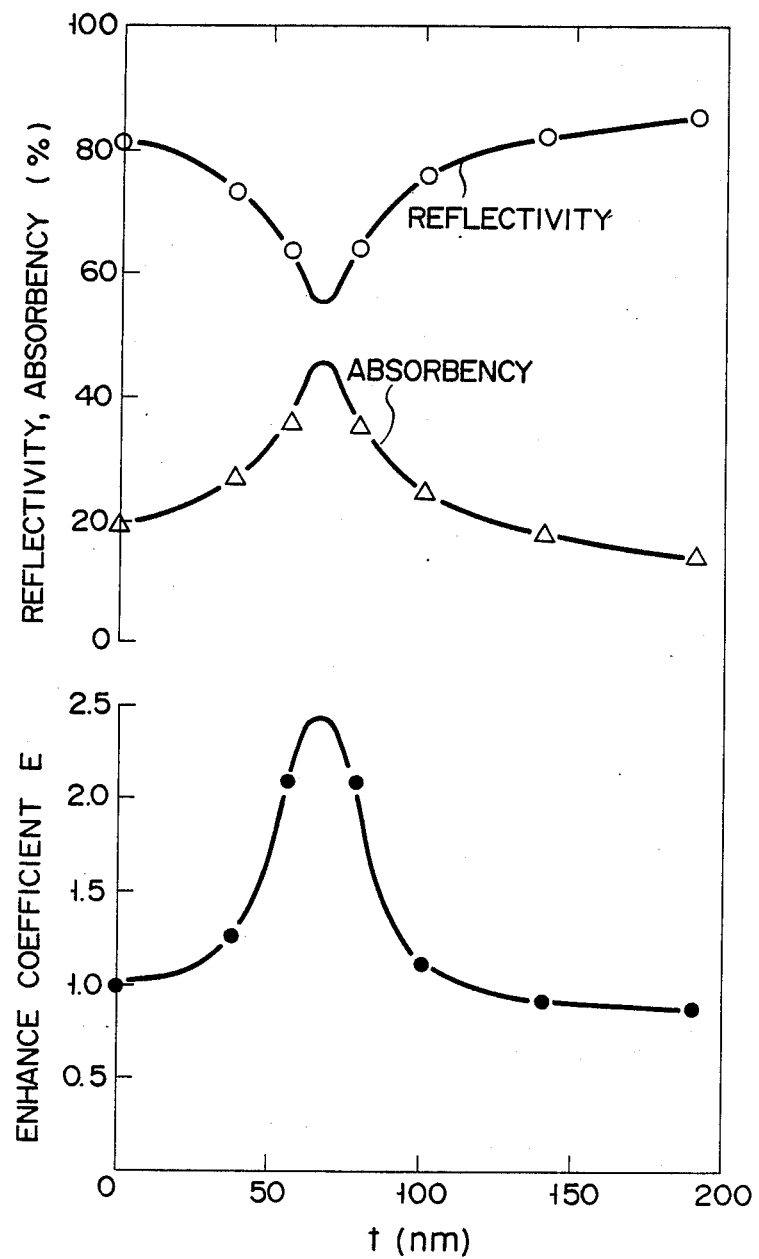

FIG. 17 shows the obtained results. Thickness $\underline{t}$ (nm) of the silicon nitride film is plotted along the abscissa, and enhancement coefficient E, reflectivity and absorbency are plotted along the ordinate. It is seen from FIG. 17 that near thickness t=70 nm, the reflectivity decreases and enhencement coefficient E becomes twice or more of that corresponding to other values of film thickness t. It is also seen from FIG. 17 that the absorbency increases within a film thickness range of t=40 to 90 nm. Since absorption of optical energy by the transparent dielectric film is negligible, an increase in absorbency indicates an increase in absorption of optical energy in the crystalline thin film. According to these experiments, in a multilayered structure, the contrast ratio of the reproduced signal to a no signal is increased, and a laser power required for recording is reduced.

FIG. 16 shows results obtained when similar samples were tested using a laser beam having a wavelength of 830 nm. According to the results obtained, the reflectivity decreased and absorbency increased at film thickness t=80 to 140 (nm).

A similar test was performed for the multilayered structure shown in FIG. 13B. The multilayered structure was obtained by forming a silicon nitride film having a thickness t (nm) as transparent dielectric film 23 on glass substrate 21, and forming a 100 nm thick Cu-Al (12.4 wt %) thin film on the silicon nitride film by the binary sputtering method, as described above. In this multilayered structure, for a laser beam having a wavelength of 633 nm, a change in reflectivity was enhanced and absorbency was increased within a thickness t range of 40 to 90 nm, and for a laser beam having a wavelength of 830 nm, a change in reflectivity was enhanced and absorbency was increased within a thickness t range of 40 to 140 nm.

In the above example, the multilayered structure was a bilayered structure. However, the structure can have three or more layers so as to effitively utilize light which is transmitted through the crystalline thin film to obtain still better effect.

APPLICATION EXAMPLE 2

In Application Example 2, a Cu-Al(13 wt %) alloy was used to form crystalline thin film 22 as described above, silicon nitride was used for a dielectric thin film, and Al was used as a reflection film. Thus, test samples had three or four layers. The first memory medium structure had a three-layer structure shown in FIG. 14B. More specifically, a 40 nm thick Cu-Al alloy thin film was formed as a recording layer on a substrate. A 110 nm thick silicon nitride film was formed as a dielectric film on the alloy film. A 200 nm thick Al film was formed thereon as a reflection film. The second memory medium structure was a four-layer structure obtained by adding another dielectric film to the first structure, as shown in FIG. 15B. In the second memory medium structure, a 50 nm thick silicon nitride film was formed as a first dielectric film on the substrate. A 40 nm thick Cu-Al alloy thin film was formed as a memory medium on the silicon nitride film. A 110 nm thick silicon nitride film as a second dielectric film was formed on the recording layer. A 200 nm thick Al film was formed on the second dielectric film. The first and second structures were irradiated with an He-Ne laser beam having a wavelength of 633 nm from the side of the substrate. When information was recorded using this laser beam, enhancement coefficient E was 10 or more, the recording sensitivity was improved, and the S/N ratio of the reproduced signal was improved over the single-layer structure. The present inventors tested the three- and four-layer structures as described above varying the thickness of the Cu-Al alloy film. It was found as a result of these tests that the thickness of the Cu-Al alloy film is preferably 15 to 40 nm.

Figure 19:
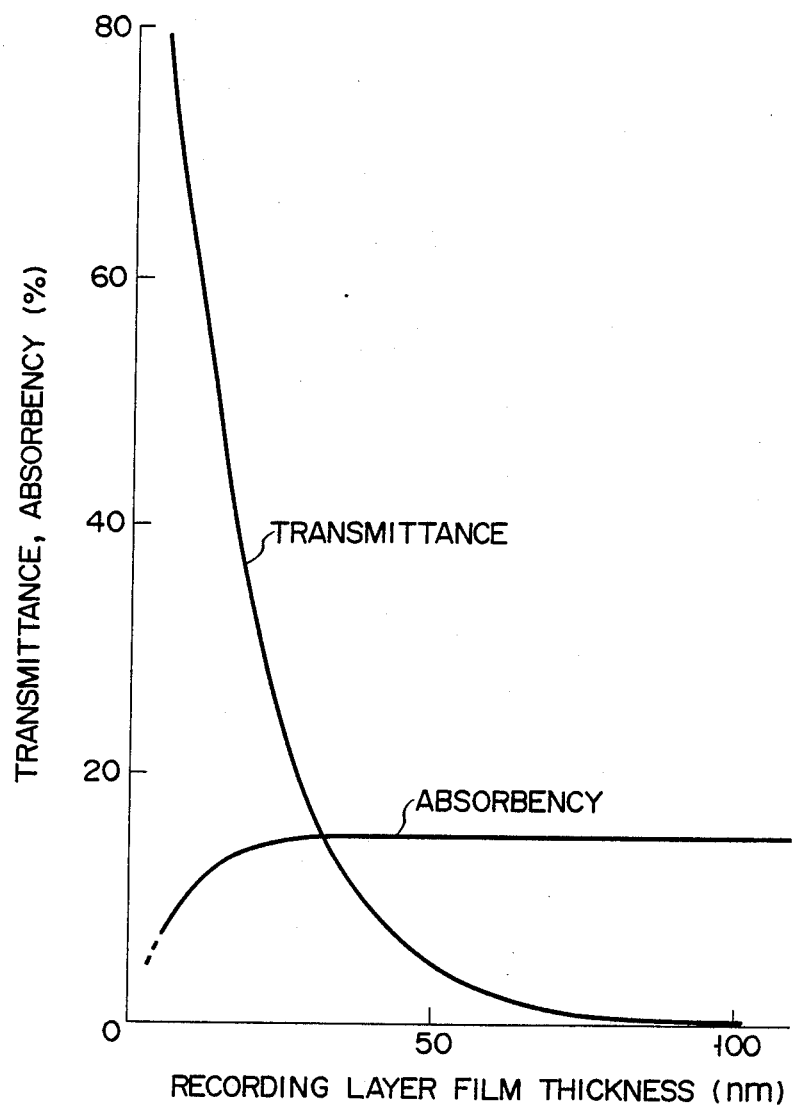
FIG. 19 is a graph showing reflectivity and absorbency as functions of film thickness when a Cu-Al alloy is used as a single memory layer of the present invention.

FIG. 19 shows results obtained when Cu-Al alloy films of various thicknesses and of single-layer structure were formed on glass substrates, the media were irradiated with a laser beam having a wavelength of 633 nm, and absorbency and transmittance for the laser beam were measured. In order to provide good characteristics as memory media having three- or four-layer structures, the transmittance of the recording layer having a single-layer structure is preferably 7% or more. Therefore, the Cu-Al alloy film shown in FIG. 19 preferably has a thickness of 40 nm or less. When the thickness becomes 15 nm, absorbency is decreased as can be seen from FIG. 19. Since this means a decrease in recording sensitivity, the thickness of the alloy film is preferably 15 nm or more. A similar result was obtained for a laser beam having a wavelength of 830 nm. It is seen from the above that the thickness of the alloy film for media having the three- or four-layer structure is preferably 15 to 40 nm.

APPLICATION EXAMPLE 3

In Application Examples 1 and 2, memory media suitable to the first recording/erasure system shown in FIG. 11 were tested. In Application Example 3, memory media suitable to the second recording/erasure system shown in FIG. 12 will be described.

Figure 18:
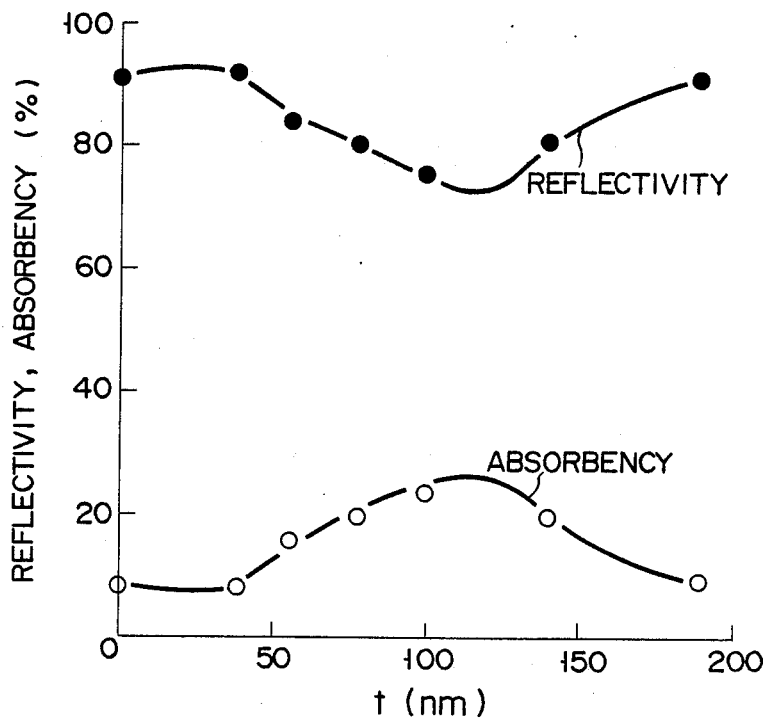
FIGS. 17 and 18 are graphs showing reflectivity, absorbency, and enhancement coefficients as a function of film thickness of a transparent dielectric layer in a multilayered memory medium.

A Cu-Al alloy film was used as a recording layer and was formed by the binary vacuum deposition method. Cu was evaporated using a magnesia crucible or a boron nitride sintered crucible. Al was evaporated using a pyrolytic boron nitride (Union Carbide Co.) or a BN composite crucible (Denki-Kagakusha K.K.) The vacuum pressure during deposition was $2 \times 10^{-6}$ Torr or less. The distance between the bottom of each crucible and the substrate surface was about 250 mm, and the substrate was not rotated but was fixed. The composition of the recording layer formed was adjusted by controlling the supply power to a tungsten heater for heating each crucible and thereby precisely controlling the evaporation amount of each element. The deposition rate on the substrate was $20\pm2$ nm/min. By optimizing the film formation conditions in this manner, in a recording layer having a composition containing about 13% of Al, martensitic transformation start temperature Ms was controlled to be 25° C. and reverse transformation start temperature As was controlled to be 220° C. The second method described above was used to provide a memory medium optimal for use at room temperature. Multi-layered structures obtained by forming recording layers, silicon nitride films (by RF sputtering method) and Al reflection films were subjected to the same tests as in Application Examples 1 and 2. As a result of the tests, similar results to those in Application Example 1 shown in FIGS. 17 and 18 and to those in Application Example 2 shown in FIG. 19 were obtained, demonstrating the effectiveness of the present invention. It was also confirmed that multilayered structures do not adversely influence the stress-induced phase transition as the recording principle of the present invention.

APPLICATION EXAMPLE 4

In Application Example 4, an Ni(38–32 at %)-Al alloy was used as a crystalline thin film or a recording layer. It was found by the present inventors that this alloy undergoes the martensitic transformation and causes a change in optical reflectivity upon the transformation. In Application Example 4, the recording layer was formed by normal RF sputtering. FIG. 20 is a graph showing reflectivity, as a function of temperature, for a laser beam having a wavelength of 830 nm when the recording layer is an Ni-Al(about 37 atom %) thin film. Reflectivity is reversibly changed with a hysteresis upon the martensitic transformation. The obtained recording layer and multilayered structures obtained by stacking a transparent dielectric film and a reflection film as in Application Examples 1 and 2 were subjected to the same tests as in Application Examples 1 and 2. Then, similar results to those in Application Examples 1 and 2 were obtained. For example, in a bilayered structure wherein a silicon nitride film was formed as a transparent dielectric film on a light incident surface of the recording layer, reflectivity change was enhanced and the optical energy absorbency was increased when the thickness of the silicon nitride film was 50 to 110 nm. FIG. 21 shows the results obtained when Ni-Al alloy thin films of various thicknesses and of single-layer structure were formed on glass substrates, the films were irradiated with a laser beam having a wavelength of 830 nm, and absorbency and reflectivity for the laser beam were measured. In three- and four-layer structures, the transmittance of only the recording layer is preferably 7% or more. Therefore, the thickness of the Ni-Al alloy thin film is preferably 40 nm or less, as can be seen from FIG. 21. However, when the film thickness is below 10 nm, the absorbency is decreased, as can be seen from FIG. 21. Since this means a decrease in recording sensitivity, the film thickness is preferably 10 nm or more. In three- or four-layer structures, the thickness of the Ni-Al alloy thin film is preferably 10 to 40 nm.

When the memory medium is an Ni-Al alloy recording layer, martensitic transformation start temperature Ms can be controlled to be at room temperature or less by adjustment of the composition. Therefore, either the first or second recording/erasure system described above can be adopted.

In the examples described above, Cu-Al or Ni-Al alloy films are used as recording layers, and silicon nitride films are used as transparent dielectric films. However, the present invention is not limited to this. Any material having a complex index of refraction which changes in accordance with a crystal structure phase transition can be used. Any thermally stable material can be used for the thin transparent dielectric film. A thin transparent dielectric film formed directly on a substrate preferably has a difference of 0.3 or more in refractive index with respect to that of the substrate. A thin film for reflecting light is not limited to an Al film, but can be any film. However, a reflection film preferably has a reflectivity of 80% or more.

According to the present invention, memory medium structures having the following various effects can be obtained:

(1) The recording/erasure system of information does not involve atom diffusion, and the crystal structure phase transition involves only a short diffusion distance. Therefore, information can be recorded or erased at high speed.

(2) Signals can be reproduced from the memory media at a high S/N ratio.

(3) Since general inexpensive elements such as Fe, Ni, Cu or Al can be used as a material for memory media, inexpensive memory media can be manufactured.

(4) Since memory media mainly consist of such elements as described in item (3) above, sufficient oxidation resistance and weather resistance can be obtained when compared with media using rare earth elements.

(5) Since memory media can have a single-layer structure, the manufacturing process is simple and the manufacturing cost is reduced.

(6) Memory media which have small changes in volume per unit cell upon phase transition can be manufactured. For example, when a memory medium uses a Cu-Al alloy, a volume change of only 0.3% is experienced upon phase transition. In such memory media, both recording and non-recording portions are kept adhered to the substrate, so that the memory medium will not easily peel off of the substrate.

In memory medium structures using a light beam for recording or erasing information, the following effects are obtained in addition to the above effects:

(7) Since a polarizer and an analyzer are not required, the optical system is simplified, and the S/N ratio of the reproduced signals is improved.

(8) A heating means and a magnetic field applying means are not required in addition to a light source for radiating a light beam. Memory device can be simplified.

(9) Since tracks for erasure light beam or separation tracks need not be formed in addition to recording tracks, recording density can be increased.

What is claimed is:

1. A reversible memory system comprising:
    a substrate having an upper surface;
    a recording metal layer formed on said upper surface and adhering thereto of said substrate and essentially consisting of;
    a recording medium made of an alloy which undergoes martensitic transformation from a first martensitic to a second martensitic phase at a predetermined temperature and which undergoes a stress-induced transformation in a region in which a pressure is applied at a temperature less than or equal to a predetermined characteristic temperature, the region in which the pressure is applied undergoing a transformation from the first to the second phase and which remains adhered and non-deformed to said surface of said substrate in both first and second phases;
    means for generating a pulsed laser beam;
    means for directing the laser beam toward said recording layer in a recording mode, so as to allow the region in said recording layer irradiated with the laser beam to undergo said stress-induced transformation;
    means for converting a portion of said recording layer from the second martensitic phase to the first martensitic phase by a martensitic reverse transformation; and
    detecting means for detecting the phase state of the region in said recording layer.

2. A system according to claim 1, comprising:
    means for the gradual heating of the overall recording medium and gradually cooling so as to convert said medium from the second phase to the first phase.

3. A system according to claim 1, further comprising: means for irradiating said recording medium with a laser beam and means for locally and gradually heated said medium and gradually cooling said medium so that said memory medium is converted from the second phase to the first phase.

4. A system according to claim 1, wherein said recording medium essentially consists of:
an iron-nickel alloy containing iron as a major component, 27 to 34% by weight of nickel, and 0 to 2% by weight of carbon.

5. A system according to claim 1, wherein said recording medium essentially consists of:
an iron-nickel alloy containing iron as a major component and 27 to 30 atomic % of nickel.

6. A system according to claim 1, wherein said memory medium consists of:
a copper-aluminum alloy containing copper as a major component, 9 to 15% by weight of aluminum, and 0 to 5% by weight of nickel.

7. A system according to claim 1, wherein said recording medium has different colors in said first and the second phases.

8. A system according to claim 1, further comprising:
a transparent dielectric layer formed on a substrate together with said recording layer, and said laser beam is adapted to radiate to said recording layer through said dielectric layer.

9. A system according to claim 8, wherein said recording medium essentially consists of:
a copper-aluminum alloy containing copper as a major component and 9 to 15% by weight of aluminum, and said transparent dielectric film essentially consists of silicon nitride and has a thickness of 40 to 140 nm.

10. A system according to claim 8, wherein said recording medium essentially consists of:
a copper-aluminum alloy containing copper as a major component and 9 to 15% by weight of aluminum and has a thickness of 15 to 40 nm.

11. A system according to claim 1, further comprising a reflection film for reflecting light formed on opposite side of a light incident surface of said recording layer together with said recording layer and said transparent dielectric film.

12. A system according to claim 11, wherein said recording medium essentially consists of a copper-aluminum alloy containing copper as a major component and 9 to 15% by weight of aluminum, and said transparent dielectric film consists of silicon nitride and has a thickness of 40 to 140 nm.

13. A system according to claim 11, wherein said recording medium essentially consists of a copper-aluminum alloy containing copper as a major component and 9 to 15% by weight of aluminum and has a thickness of 15 to 40 nm.

* * * * *